March 10, 1970    H. J. FREMONT ET AL    3,500,367
HEAT DETECTION SYSTEM
Filed March 11, 1966      2 Sheets-Sheet 1
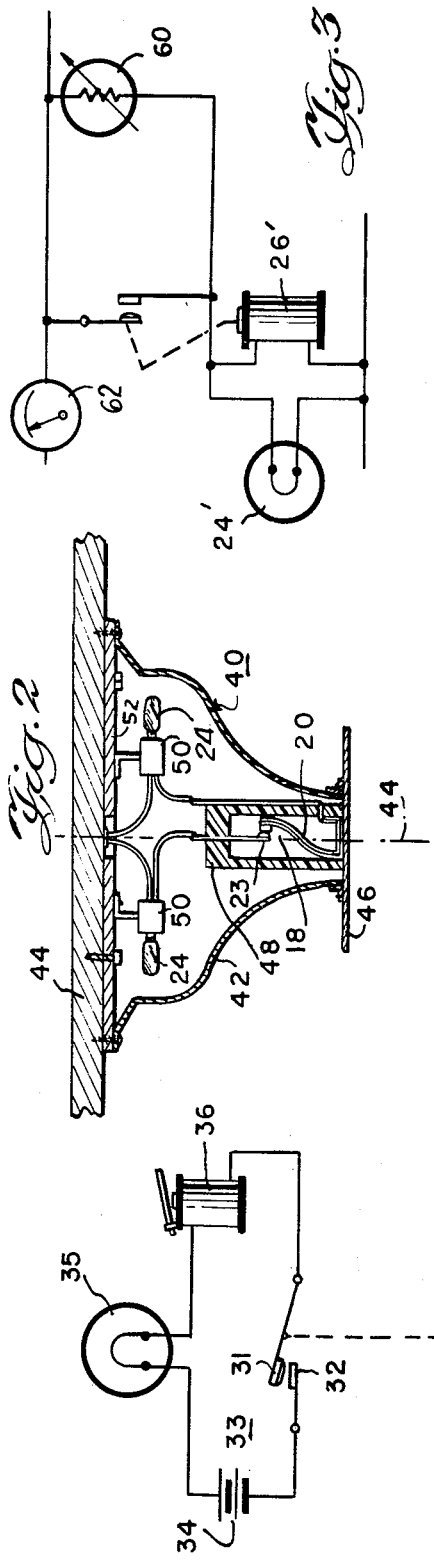
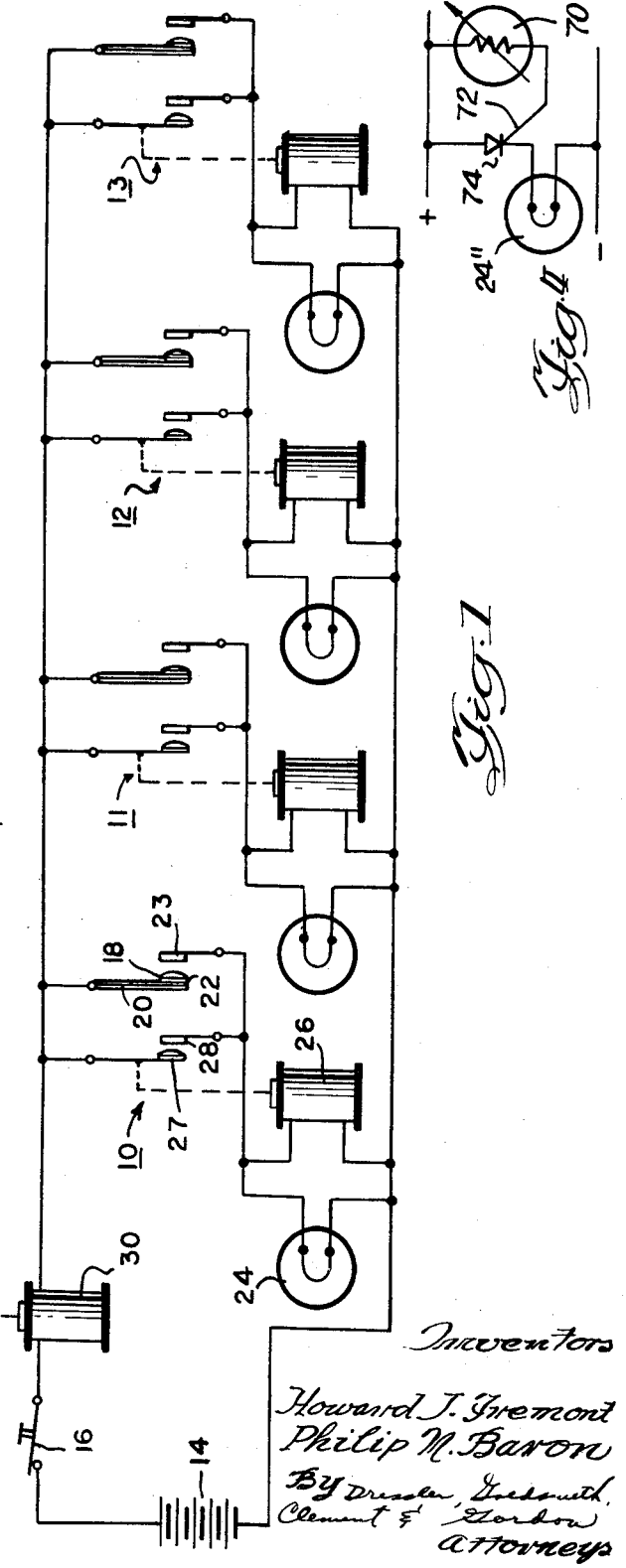

United States Patent Office 3,500,367
Patented Mar. 10, 1970

3,500,367
HEAT DETECTION SYSTEM
Howard J. Fremont, New York, N.Y., and Philip N. Baron, Chicago, Ill., assignors, by mesne assignments, to Howard J. Fremont & Company, Inc., a corporation of Illinois
Continuation-in-part of application Ser. No. 466,951, June 25, 1965. This application Mar. 11, 1966, Ser. No. 533,734
Int. Cl. G08b 21/00
U.S. Cl. 340—228      7 Claims

ABSTRACT OF THE DISCLOSURE

An overheat detection system including a plurality of separate branch networks each of which has a silicon-controlled rectifier. Temperature responsive means are connected to the gate of the silicon-controlled rectifier to trigger the rectifier in response to a predetermined temperature level. Each branch network includes a lamp for signalling an overheat condition and each silicon-controlled rectifier is connected in its branch network so that it does not control other branch networks.

---

This application is a continuation-in-part of application Ser. No. 466,951, now abandoned, filed June 25, 1965.

This invention relates to a novel system for detecting an overheat condition.

A great need has developed for a system that can be used in large buildings (1) to detect an overheat condition, such as a fire in a portion of the building, and (2) to indicate the area where the condition has occurred or where it is in progress. Such a system is provided by the present invention, which utilizes electrical circuits that operate in a highly efficient manner and require relatively few component parts.

In accordance with the present invention, there is provided a detection system that includes several thermal responsive members, each of which is located in a strategic position in the building and is constructed to activate a visual signal device.

Although the overheat condition might become corrected, or the temperature might drop below the temperature required to activate the thermal responsive member, it is often necessary to know where the condition has occurred to make certain that no deleterious effects were suffered by the nearby equipment. To this end, means are provided to retain activation of the visual signal notwithstanding a temperature drop at the area where the overheat condition has occurred.

The system of the present invention comprises a heat responsive circuit including several parallel branches. Each of the branches includes a thermal responsive member adapted for actuation in response to an overheat condition and a visual signal device responsive to actuation of the thermal responsive member. Holding means responsive to actuation of the thermal responsive member are provided for completing the visual signal circuit notwithstanding the deactuation of the thermal responsive member due to a temperature drop. The holding means include switching means which are connected to the thermal responsive member.

Alarm signal means, responsive to the completion of the heat responsive circuit, are provided to give immediate indication that an overheat condition has occurred. The alarm signal means are positioned in a central location whereby an operator can determine if an overheat condition has occurred anywhere throughout the building.

In one embodiment of the invention, the thermal responsive member is located within a device which comprises both the thermal responsive member and the visual signal device. In this manner, the visual indication that an overheat condition has occurred will be presented at the location of the overheat condition.

A further explanation of the invention is provided in the following description, and is illustrated in the accompanying drawing, in which:

FIGURE 1 is a schematic diagram of a circuit embodying the principles of the present invention;

FIGURE 2 is a cross-sectional elevational view of a thermal device in accordance with the principles of the present invention;

FIGURE 3 is a fragmentary schematic diagram of a modified form of one of the branches of the heat detection circuit of FIGURE 1;

FIGURE 4 is a fragmentary schematic diagram of a further modification thereof;

Figure 5:
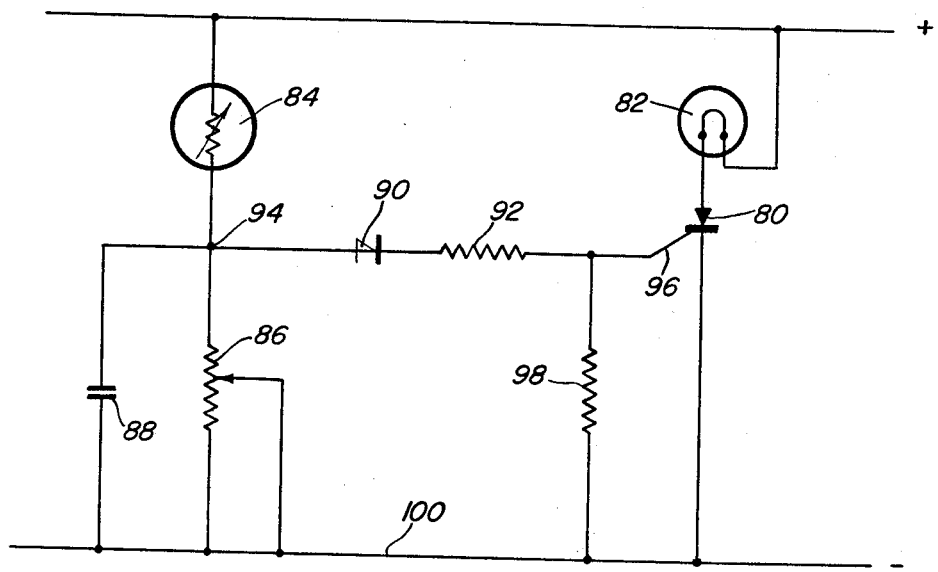
FIGURE 5 is a fragmentary schematic diagram of another modification thereof.

In the embodiment of the invention illustrated in FIGURE 1, the system includes an electrical circuit comprising a plurality of branches 10, 11, 12 and 13, connected in parallel with one another and in circuit with a source of electrical circuit, such as a battery 14. A manually operable switch 16 is connected in series with the battery 14.

Since the components included in each of branch circuits 10–13 are similar, only branch 10 will be discussed in detail. This branch includes a temperature responsive bimetallic switch 18 comprising a bimetallic element 20 having an electrical contact 22, and a stationary contact 23, which is connected in series with a lamp 24. A relay 26 is connected in parallel with lamp 24, and the relay contacts 27 and 28 are connected in parallel with temperature responsive switch 18.

Relay 26 and its associated contacts 27 and 28 act as a holding circuit for lamp 24, whereby a drop in temperature causing contact 22 to disengage contact 23 subsequent to activation of the thermal responsive switch 18 will not result in opening of the lamp circuit, and thus lamp 24 will remain energized.

A relay 30 is provided in series with branches 10, 11, 12 and 13. Relay 30 has associated contacts 31 and 32 which are connected in series with a centralized alarm circuit 33. Alarm circuit 33 includes a battery 34, a lamp 35 and a buzzer 36, all connected in series relationship with contacts 31 and 32.

Each of the temperature responsive switches 18 is positioned in a strategic location in the building. For example, in a large building each switch 18 may be positioned 50 feet from another. When an overheat condition occurs, such as a fire in a portion of the building, the switch adjacent the overheat condition will respond and contacts 22 and 23 will close, thereby completing the circuit and energizing lamp 24. Relay 30 will also be energized, closing contacts 31 and 32 and causing lamp 35 and buzzer 36 to be energized, thereby giving a signal at the central location. The operator, positioned at the central location, can note the visible and audible signal given by lamp 35 and buzzer 36 and can proceed to determine where the overheat condition has occurred. By noting the visual signal emitted by lamp 24, the operator can ascertain where the overheat condition has occurred, even though the temperature has dropped to a point where the condition is no longer dangerous. To this end, the holding circuit formed by relay 26 and its associated contacts 27 and 28 will retain energization of lamp 24 notwithstanding the opening of contacts 22 and 23 due to a temperature drop.

After the overheat condition is located and corrected by the operator, the operator can manually open switch 16, thereby causing relay 26 to be deactuated and lamp 24 to be deenergized. The switch 16 is then closed and the system is again ready to resume its normal detection operation.

With the system of the present invention used in a multi-story building, a separate circuit, such as the circuit shown in FIGURE 1, is utilized on each floor of the building. All of the alarm circuits 33 are located at a central position, whereby the operator can immediately determine on which floor the overheat condition has occurred by noting which lamp is energized.

A temperature responsive device, that can be utilized in the present invention, is illustrated in FIGURE 2. The temperature responsive device 40 includes a housing 42 which is formed of a transluscent plastic material and is connected by suitable fastening means to the ceiling 44 of the building. The device 40, which is symmetrical about centerline 44, includes a heat collector 46 in the form of a circular metal disc, which is connected to housing 42. Positioned within housing 42 is temperature responsive bimetallic switch 18. Switch 18 is connected to heat collector 46 and is located within a heat insulative housing 48.

A pair of lamps 24 are positioned within light bulb sockets 50, which sockets are connected to a base 52 of device 40. The lamps 24 are utilized to illuminate the transluscent housing 42 from within. As shown in FIGURE 2, lamps 24 are connected in series with one another and are also in series circuit with temperature responsive switch 18.

The thermal device 40 shown in FIGURE 2 provides an effective means for obtaining a visual signal at the location of the overheat condition, and the unit can be manufactured to provide a compact device which can be readily connected to the ceilings of a building.

In FIGURE 3 a modified form of a branch of the circuit of FIGURE 1 is illustrated. This branch includes a semiconductor device (thermistor) 60 having a sharp negative temperature coefficient of resistance. As a specific example, a semi-conductor device that can be used with the present invention is sold by Newark Electronics Co., Inc., Chicago, Ill. under the trade name "YSI Thermistor Type 44001." The circuit constants are such, i.e. the resistances of the lamp, the relay and the thermistor, that at a predetermined temperature the resistance of the thermistor will enable the relay to close, thereby illuminating the lamp. The increase of current drawn at this point is then used to close the alarm relay. A meter 62, which is calibrated in degrees (Fahrenheit) to depict the temperature in correlation to the current flow through the circuit, is connected in the circuit as shown. Lamp 24' and relay 26' are connected in parallel with one another and in series with the temperature responsive element 60, in a similar manner that lamp 24 and relay 26 are connected with respect to bimetallic switch 18. The circuit of FIGURE 3 operates in the same manner as circuit 10 of the FIGURE 1 embodiment.

Another modified form of a branch of the circuit of FIGURE 1 is illustrated in FIGURE 4. This branch, like the branch shown in FIGURE 3, includes a semiconductor device (thermistor) 70 having a sharp negative temperature coefficient of resistance. Thermistor 70 is connected to the gate 72 of a silicon controlled rectifier (SCR) 74. A lamp 24" is connected in series with SCR 74.

The circuit constants are such that at a predetermined temperature the resistance of the thermistor 70 will be low enough to permit triggering of the SCR, resulting in energization of the lamp 24". Once the SCR has been triggered, the SCR loses control and it will continue to conduct notwithstanding a reduction in current flow through the gate circuit, caused by a drop in temperature. The circuit of FIGURE 4 will operate in the same manner as the circuit 10 of the FIGURE 1 embodiment.

As a specific example, a suitable SCR for use in the circuit of FIGURE 4 is sold by Motorola, Inc. under model number MCR-1304-4, and a suitable thermistor is sold by the Victory Engineering Corporation of Springfield, N.J. under the trademark "Veco," model 33D2. A 24 volt D.C. supply can be used with these components.

In FIGURE 5, a further modified form of a branch of the circuit of FIGURE 1 is illustrated. This branch includes an SCR 80 in series with a lamp 82. The trigger circuit for the SCR includes a half bride comprising a thermistor 84 and a potentiometer 86. A capacitator 88 is connected in parallel with the potentiometer 86, and a line including a four layer diode 90 in series with a current limiting resistor 92 is connected from the center point 94 of the bridge to the gate 96 of the SCR 80. A gate loading resistor 98 is connected to the gate 96 of the SCR 80 and to the negative line 100, to provide a path for the leakage current of the SCR.

The circuit of FIGURE 5 operates in the following manner. Under normal temperature conditions, most of the voltage drop occurs across the thermistor 84. Due to the negative temperature coefficient of resistance of the thermistor 84, when the ambient temperature increases, the risistance of the thermistor will decrease. Hence, the voltage across the potentiometer 86 will increase, and when the voltage across the potentiometer reaches the break-over point of the four layer diode, the diode will go into conduction allowing the capacitor 88 to discharge through the gate of the SCR 80. The SCR will go into conduction, causing the lamp 82 to be energized.

The temperature at which energization of the lamp 82 will occur is controlled by the setting of the potentiometer 86. The voltage at the center point 94 of the bridge can vary over a range from zero voltage up to the break-over voltage of the four layer diode without causing the SCR to go into conduction. Because of the snap action of the four layer diode, no additional compensation is needed in the bridge circuit.

Once the SCR has been triggered, it loses control and will continue to conduct notwithstanding a reduction in current flow through the gate circuit, caused by a drop in temperature. The circuit of FIGURE 5 will operrate in the same manner as the circuit 10 of FIGURE 1 embodiment.

The circuit of FIGURE 5 can be adjusted to indicate a predetermined temperature change by merely adjusting the resistance of potentiometer 86. If the resistance is relatively high, the circuit will be sensitive to a very slight change in ambient temperature. On the other hand, if the resistance of the potentiometer 86 is relatively low, a large change of temperature will be required in order to cause the four layer diode 90 to break-over. The four layer diode, therefore, is the standard reference point for the circuit. Before the SCR can operate, the reference voltage must always be reached, and hence a very repeatable circuit is provided, allowing an accurate setting for the desired ambient temperate change.

As a specific example, a 50 volt SCR could be used in combination with a Motorola M4L3054 four layer diode 90, a 100 ohm current limiting resistor 92, a 1K gate loading resistor 98, a 100K potentiometer 86, a GE 4D-051 thermistor 84 and a 0.1 mf., 50 volt capacitor 88. A 24 volt D.C. supply can be used with these components.

Figure 6:
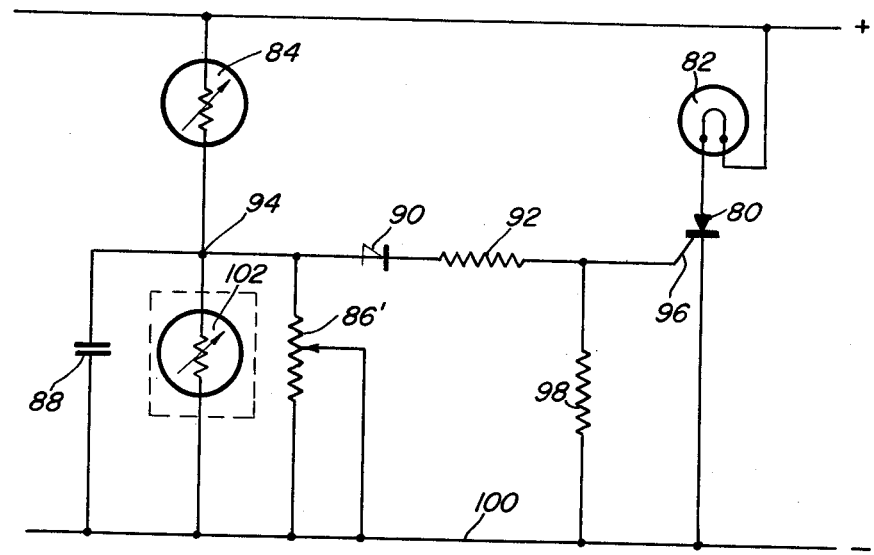
FIGURE 6 is a fragmentary schematic diagram of a further modification thereof.

In the FIGURE 6 embodiment, a circuit is provided which will respond to an extraordinarily rapid rate of rise in the ambient temperature. A circuit similar to the circuit of FIGURE 5 is provided, with the addition of a compensator thermistor 102 connected in parallel with the potentiometer 86'. The thermistor 102 is mounted in a relatively thermal insulated space as compared to the location of the detector thermistor 84, which may be free to air. The thermistor 102 is the same type as the thermistor 84, and because both legs of the bridge have elements which are affected equally by temperature changes, the voltage at the center point 94 of the bridge will remain "constant" with normal temperature changes. Because, however, the compensator thermistor 102 is mounted in a greater thermal mass than the detector thermistor 84, the variance of resistance of thermistor 102 in response to ambient temperature change will be slower than the variance of the detector thermistor 84. If the rate of temperature change is rapid enough, the voltage at the center point of the bridge will rise to the break-over point of the four layer diode 90, thereby initiating the same action as described with reference to FIGURE 5.

The rate of change to which the circuit is to respond can be varied by adjusting the resistance of the potentiometer 86', and also by varying the amount of insulation surrounding the compensator termistor 102. The potentiometer may also be utilized to vary the degree of temperature change required to create the alarm signal.

As a specific example, the components of the FIGURE 6 circuit can be identical to the components of the FIGURE 5 circuit, although it has been found advantageous to utilize a 500K potentiometer 86'.

Although various embodiments of the invention have been described, it is to be understood that other modifications and substitutions may be made without departing from the novel spirit and scope of the present invention. For example, the switches shown normally open could be normally closed and then opened in response to an overheat condition, and the lamps could be normally energized but become deenergized in response to the overheat condition. Further, an alternating current source could be used instead of the direct current source illustrated. There are many other modifications which may become obvious in view of the present disclosure, and the present invention is intended to encompass all equivalents falling within its scope.

What is claimed is:

1. An overheat detection system which comprises: a heat responsive signal circuit adapted for connection to a source of electrical current, said circuit including a plurality of separate branch networks each of which includes a silicon-controlled rectifier having a gate; temperature responsive means connected to said gate to trigger the rectifier in response to a predetermined temperature level, said temperature responsive means including voltage divider means, said voltage divider means including a first arm extending from a first point having a temperature responsive device connected in series therewith and a second arm extending from said first point having a variable resistance connected in series therewith, a switching device responsive to a predetermined conduction of said temperature responsive device, said switching device being coupled between said first point and the gate of said rectifier; indicating means in each branch network responsive to the firing of the silicon-controlled rectifier in the respective branch network for signalling an overheat condition; means for opening the signal circuit; and central alarm signal means responsive to the completion of said heat responsive circuit by the firing of the silicon-controlled rectifier in any of said branches.

2. An overheat detection system as described in claim 1, wherein said switching device comprises a four layer diode.

3. An overheat detection system as described in claim 1, including a capacitor connected in parallel with said variable resistance; and said signalling means comprises a visual signal device responsive to conduction of said silicon controlled rectifier.

4. An overheat detection system as described in claim 1, including compensating means connected in parallel with said variable resistance, said compensating means comprising a second temperature responsive device having relatively greater thermal insulation than said aforementioned temperature responsive device whereby the conductivity of said second temperature responsive device will change at a slower rate than the conductivity of said aforementioned temperature responsive device in response to a rise in ambient temperature.

5. An overheat detection system as described in claim 4, including a capacitor connected in parallel with said compensating means.

6. An overheat detection system as described in claim 1, wherein said indicating means comprises a visual signal device in series with said silicon controlled rectifier.

7. An overheat detection system as described in claim 1, wherein each silicon controlled rectifier is connected in its branch network so that it does not control the signalling means of other branch networks.

References Cited

UNITED STATES PATENTS

| | | | |
|---|---|---|---|
| 2,891,240 | 6/1959 | Rohulich | 340—227.1 |
| 1,111,708 | 9/1914 | Simms | 340—227.1 |
| 2,956,267 | 10/1960 | Matthews | 340—227 |
| 3,185,974 | 5/1965 | Doane | 340—228 X |
| 3,284,787 | 11/1966 | Voigt et al. | 340—227 |
| 3,304,547 | 2/1967 | Bristol | 340—227 X |

OTHER REFERENCES

General Electric Transistor Manual, 6th ed., 1962, p. 359, FIG. 19.37.

JOHN W. CALDWELL, Primary Examiner

D. L. TRAFTON, Assistant Examiner

U.S. Cl. X.R.

307—252; 340—227